(12) United States Patent
Morii et al.

(10) Patent No.: US 7,147,077 B2
(45) Date of Patent: Dec. 12, 2006

(54) ENGINE STARTER MECHANISM ARRANGEMENT FOR SNOW VEHICLES

(75) Inventors: Hideshi Morii, Hamamatsu (JP); Toshio Hayashi, Hamamatsu (JP); Hideto Nakamura, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 148 days.

(21) Appl. No.: 10/863,602

(22) Filed: Jun. 8, 2004

(65) Prior Publication Data

US 2004/0251072 A1  Dec. 16, 2004

(30) Foreign Application Priority Data

Jun. 13, 2003  (JP)  ............... 2003-168836

(51) Int. Cl.
  *B60K 5/04*  (2006.01)
  *F02N 11/00*  (2006.01)
(52) U.S. Cl. ............... 180/291; 180/292; 180/182; 123/192.2; 123/179.25
(58) Field of Classification Search .......... 123/179.25, 123/195 AC, 193.3, 195 R, 192.2; 180/182, 180/186, 190, 291, 292, 297
See application file for complete search history.

(56) References Cited

U.S. PATENT DOCUMENTS

| | | | |
|---|---|---|---|
| 5,172,786 A * | 12/1992 | Ishibashi et al. ............ 180/190 |
| 5,218,885 A * | 6/1993 | Nakano et al. ................ 74/591 |
| 5,636,608 A * | 6/1997 | Shichinohe et al. ..... 123/197.1 |
| 6,397,810 B1 * | 6/2002 | Ohyama et al. ......... 123/192.2 |
| 6,405,821 B1 * | 6/2002 | Tsutsumikoshi ............ 180/226 |
| 6,464,033 B1 * | 10/2002 | Izumi et al. ................ 180/291 |
| 6,725,958 B1 * | 4/2004 | Ashida et al. .............. 180/186 |
| 6,745,862 B1 * | 6/2004 | Morii et al. ................ 180/296 |
| 6,941,924 B1 * | 9/2005 | Morii et al. ............ 123/198 R |
| 2002/0104499 A1 * | 8/2002 | Sanada et al. ........... 123/179.3 |

FOREIGN PATENT DOCUMENTS

| | | |
|---|---|---|
| JP | 5-149220 A | 6/1993 |
| JP | 2001-199380 A | 7/2001 |
| JP | 2001-280111 A | 10/2001 |
| JP | 2002-201954 A | 7/2002 |

\* cited by examiner

*Primary Examiner*—Christopher P. Ellis
*Assistant Examiner*—Vaughn T. Coolman
(74) *Attorney, Agent, or Firm*—Frishauf, Holtz, Goodman & Chick, P.C.

(57) ABSTRACT

An engine starter mechanism arrangement for snow vehicles, in which a starter mechanism is disposed so as to maintain excellent traveling stability of the snow vehicle. A crankshaft (7) extends through an engine (2) in a transverse direction of a body frame. A rear balancer shaft (62) is disposed in a rear part of the engine at a location rearward of the crankshaft in a manner extending substantially parallel to the crankshaft. A starter motor (65) is disposed in the engine at a location above the rear balancer shaft.

8 Claims, 13 Drawing Sheets

ENGINE STARTER MECHANISM ARRANGEMENT FOR SNOW VEHICLES

BACKGROUND OF THE INVENTION

1. Field of the Invention

The present invention relates to an engine starter mechanism arrangement for snow vehicles with a four-cycle engine installed thereon.

2. Description of the Related Art

In recent years, more and more four-cycle engines have come to be used for snow vehicles, and in snow vehicles with a four-cycle engine installed thereon, it is desired to lay out such that the overall height of the engine is made low so as to avoid interference between an engine hood or the optical path of a head light and the engine, and that the center of gravity of the engine is as closest as possible to the center of the vehicle body so as to improve traveling stability of the vehicle. For this reason, the engine is tilted rearward, for example.

Further, in the case where the engine is provided with a starter mechanism including a starter motor large in weight and volume, it is desired to lay out the starter mechanism in consideration of weight distribution of component parts thereof, and so as to avoid interference thereof with other component parts, such as a steering post, and to make effective use of space.

For example, in Japanese Laid-Open Patent Publication (Kokai) No. 2001-199380, a forward-tilted engine has been proposed in which a starter motor is disposed on a flywheel side of the engine opposite from an alternator to suppress the overall height of the engine. Also in Japanese Laid-Open Patent Publications (Kokai) No. 2002-201954, No. 2001-280111, and No. H05-149220, various designs have been proposed as to the disposition of a starter motor in the engine.

However, when a starter motor is disposed together with a clutch mechanism of a continuously variable transmission or the like, an oil pump, a balancer shaft, a magnet device, or other like components, it is important to dispose the starter motor with the relationship of the starter motor with these component parts, including weight distribution and positional relationship comprehensively taken into consideration, so as to improve traveling stability of the vehicle and suppress an increase in the size of the engine.

Further, if a starter-related component part, such as a starter limiter or a starter gear associated with the starter motor largely protrudes outward from the engine, not only space saving but also installment of the engine is hindered, and the degree of freedom in the layout of engine components within the engine room is limited. Therefore, it is necessary to consider the disposition of the starter motor together with the arrangement of the starter-related components.

SUMMARY OF THE INVENTION

It is a first object of the present invention to provide an engine starter mechanism arrangement for snow vehicles, in which a starter mechanism is disposed so as to maintain excellent traveling stability of the snow vehicle.

It is a second object of the present invention to provide an engine starter mechanism arrangement for snow vehicles, in which a starter mechanism is disposed so as to suppress an increase in the size of the engine.

To attain the above first object, in a first aspect of the present invention, there is provided an engine starter mechanism arrangement for a snow vehicle having a vehicle body, comprising an engine (2) having a rear part, a crankshaft (7) extending through the engine in a transverse direction of the vehicle body, a balancer shaft (62) disposed in the rear part of the engine at a location rearward of the crankshaft and extending substantially parallel to the crankshaft, and a starter motor (65) disposed in the engine at a location above the balancer shaft.

With this arrangement of the engine starter mechanism arrangement according to the first aspect of the present invention, the starter mechanism is disposed so as to maintain excellent traveling stability of the snow vehicle with the starter motor disposed close to the center of the vehicle body. Further, it is possible to suppress the influence of traveling wind on the starter mechanism.

Preferably, the engine starter mechanism arrangement further comprises an engine room that accommodates the engine, and a clutch mechanism (38) disposed in the engine room on one side thereof with respect to a transverse center (CL) of the vehicle body, and the starter motor is disposed on an opposite side of the engine from a side thereof on which the clutch mechanism is disposed, with respect to a transverse center (ECL) of the engine.

To attain the above first object, in a second aspect of the present invention, there is provided an engine starter mechanism arrangement for a snow vehicle having a vehicle body, comprising a crankshaft (7) extending in a transverse direction of the vehicle body, at least one crankcase (5, 6) having a rear part and rotatably supporting the crankshaft, at least one cylinder head (4) disposed above the crankcase, and a starter motor (65) disposed in the rear part of the crankcase, wherein the starter motor is disposed at a location such that when a first imaginary plane (PL1) parallel to the transverse direction of the vehicle body is brought into contact with the cylinder head and the crankcase from a rear side thereof, the starter motor does not project rearward from the first imaginary plane.

With this arrangement of the engine starter mechanism arrangement according to the second aspect of the present invention, the starter mechanism is disposed so as to maintain excellent traveling stability of the snow vehicle with the starter motor disposed close to the center of the vehicle body. Further, it is possible to suppress an increase in the size of the engine.

Preferably, the crankshaft has one end (7b), and the engine starter mechanism arrangement further comprises a starter clutch section (70) disposed on a side of the crankshaft toward the one end thereof, and a transmission mechanism (68, 69) disposed between the starter motor and the starter clutch section, for transmitting rotation of the starter motor to the starter clutch section, the transmission mechanism being disposed at a location such that when a second imaginary plane (PL2) parallel to the transverse direction of the vehicle body is brought into contact with the starter motor and the crankcase from the rear side thereof, the transmission mechanism does not project rearward from the second imaginary plane.

Preferably, the crankshaft has one end (7b), and the engine starter mechanism arrangement further comprises a starter clutch section (70) disposed on a side of the crankshaft toward the one end thereof, a transmission mechanism (68, 69) disposed between the starter motor and the starter clutch section, for transmitting rotation of the starter motor to the starter clutch section, a magnet cover (60) fixed to the crankcase on the side of the crankshaft toward the one end thereof, and at least one oil pump (FEP, SCP) disposed within the magnet cover, the transmission mechanism being disposed in the magnet cover on a substantially opposite side thereof with respect to the crankshaft, from the oil pump, as viewed in an axial direction of the crankshaft.

To attain the above second object, in a third aspect of the present invention, there is provided an engine starter mechanism arrangement for a snow vehicle having a vehicle body, comprising an engine (2) having a side part, an engine room (30) that accommodates the engine, a crankshaft (7) having opposite ends and extending through the engine in a transverse direction of the vehicle body, a clutch mechanism (38) disposed in the engine room on one side thereof with respect to a transverse center of the vehicle body, a magnet device (MG) disposed in the side part of the engine on an opposite side of the engine room from the one side thereof with respect to the transverse center of the vehicle body, a battery (51) disposed in the engine room at a location close to the magnet device, on the opposite side of the engine room with respect to the transverse center of the vehicle body, a starter motor (65) disposed on an opposite side of the engine from a side thereof on which the clutch mechanism is disposed, with respect to a transverse center of the engine, and a starter clutch section (70) mounted at a location toward one of the opposite ends of the crankshaft on the opposite side of the engine room with respect to the transverse center of the vehicle body, substantially in concentricity with the crankshaft, the starter clutch section comprising a starter one-way clutch (72), and a starter one-way gear (71) that transmits a driving force from the starter motor to the starter one-way clutch, wherein the starter one-way clutch is secured to the magnet device, and the driving force from the starter motor is transmitted to the crankshaft via the starter one-way gear, the starter one-way clutch, and the magnet device.

With this arrangement of the engine starter mechanism arrangement according to the third aspect of the present invention, the starter mechanism is disposed so as to maintain excellent traveling stability of the vehicle, with the starter motor, the battery, and the magnet device being arranged in a concentrated manner on an opposite side of the engine from a side thereof on which the clutch mechanism is disposed, to thereby distribute the weights of the component elements in a well-balanced manner. Further, it is also possible to achieve more simplified wiring in the engine room to thereby simplify the construction of the engine and save space within the engine room.

To attain the above second object, in a fourth aspect of the present invention, there is provided an engine starter mechanism arrangement for a snow vehicle, comprising a starter motor (65), a crankshaft (7) having one end, a magnet device (MG) disposed at a location toward the one end of the crankshaft, a cam sprocket (73) mounted on the one end of the crankshaft, a cam chain (74) passed over the cam sprocket, and a starter clutch section (70) mounted at a location toward the one end of the crankshaft, substantially in concentricity with the crankshaft, the starter clutch section comprising a starter one-way clutch (72), and a starter one-way gear (71) that transmits a driving force from the starter motor to the starter one-way clutch, wherein the starter clutch section is disposed between the cam sprocket and the magnet device, the starter one-way clutch is secured to the magnet device, and the driving force from the starter motor is transmitted to the crankshaft via the starter one-way gear, the starter one-way clutch, and the magnet device.

With this arrangement of the engine starter mechanism arrangement according to the fourth aspect of the present invention, the starter mechanism is disposed so as to suppress an increase in the size of the engine with a simplified construction thereof, such that the driving force from the starter motor is transmitted to the crankshaft while achieving reduced engine space.

To attain the above second object, in a fifth aspect of the present invention, there is provided an engine starter mechanism arrangement for a snow vehicle having a vehicle body, comprising at least one cylinder (94), a crankshaft (7) having one end and extending in a transverse direction of the vehicle body, at a location below the cylinder, a starter motor (65), at least one balancer shaft (62) disposed at least one of locations forward and rearward of the crankshaft and extending substantially parallel to the crankshaft, a starter clutch section (70) mounted at a location toward the one end of the crankshaft, substantially in concentricity therewith, and a starter limiter (68) and a starter gear (69) that cooperate with each other to transmit a driving force from the starter motor to the starter clutch section, wherein the starter gear, the starter limiter, and the starter motor are arranged substantially linearly, as viewed in an axial direction of the crankshaft, in a mentioned order from below, substantially along a central axis of the cylinder at a location above one of the at least one balancer shaft.

With this arrangement of the engine starter mechanism arrangement according to the fifth aspect of the present invention, the engine starter mechanism is disposed so as to suppress an increase in the size of the engine by making effective use of space on a side of the cylinders toward the balancer.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing a preferred embodiment thereof.

Figure 1:
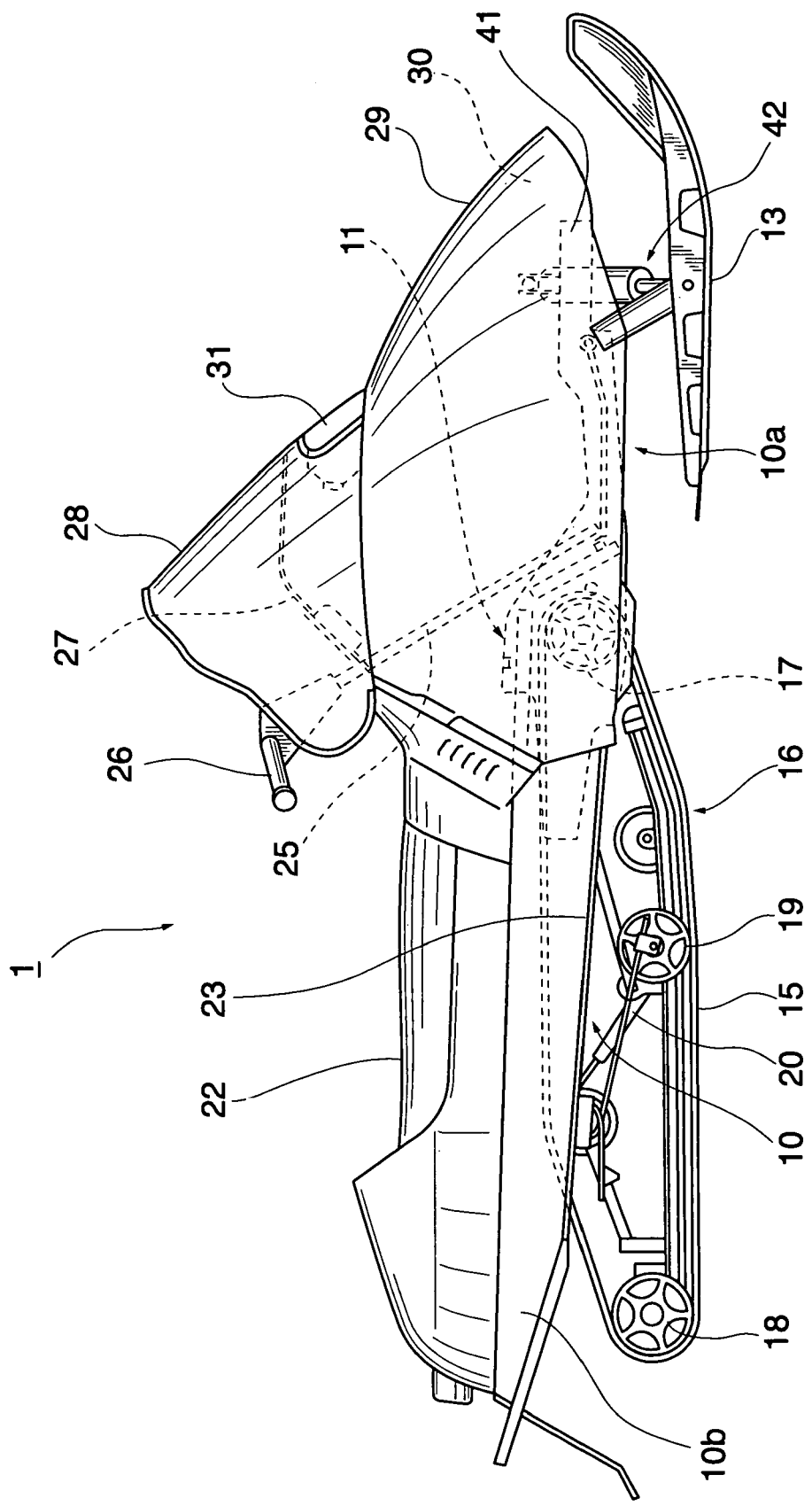
FIG. 1 is a side view showing a snow vehicle with an engine starter mechanism arrangement according to an embodiment of the present invention.
Figure 2:
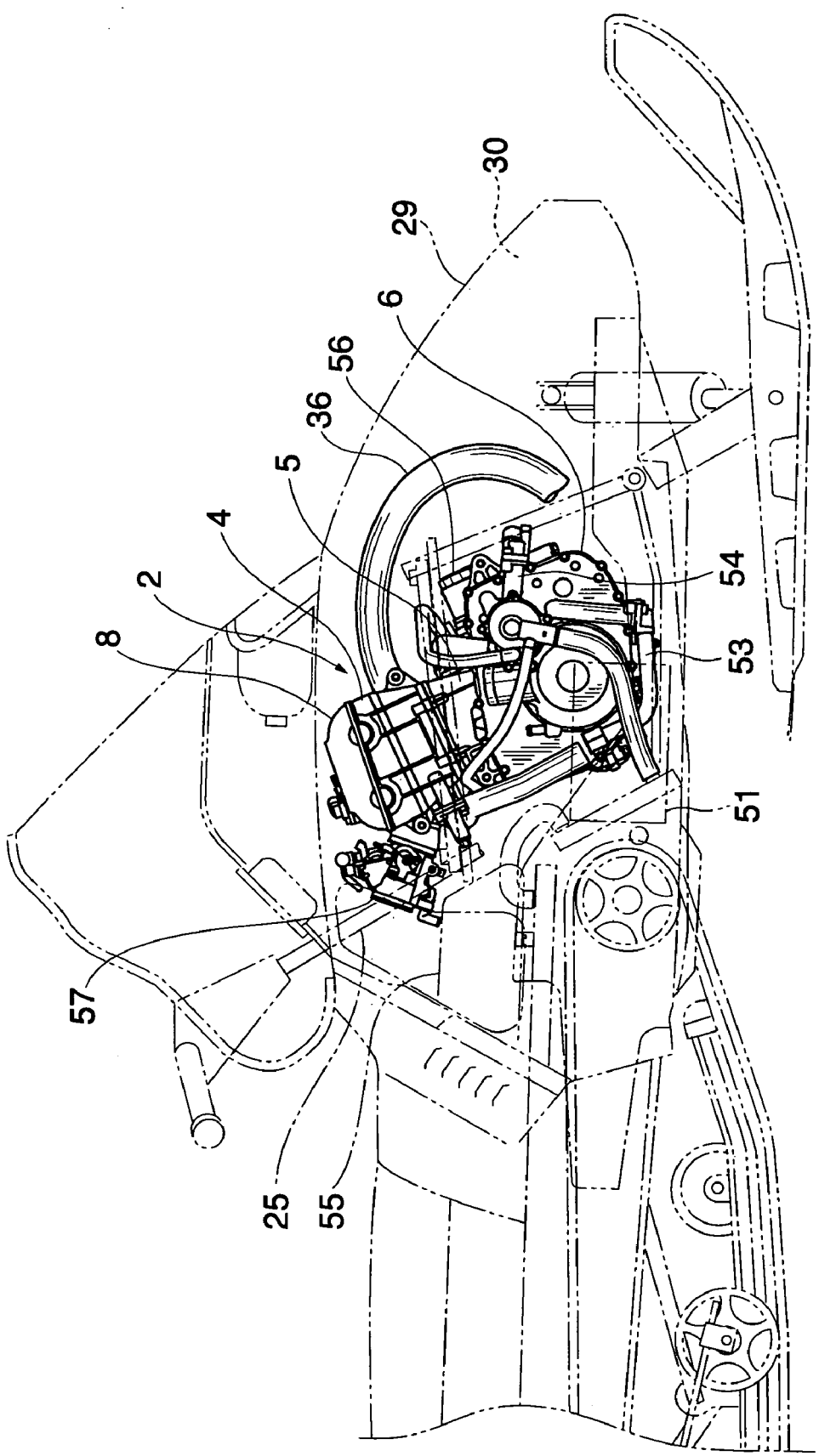
FIG. 2 is a perspective view showing the interior of an engine room as viewed from a lateral side of the vehicle.
Figure 3:
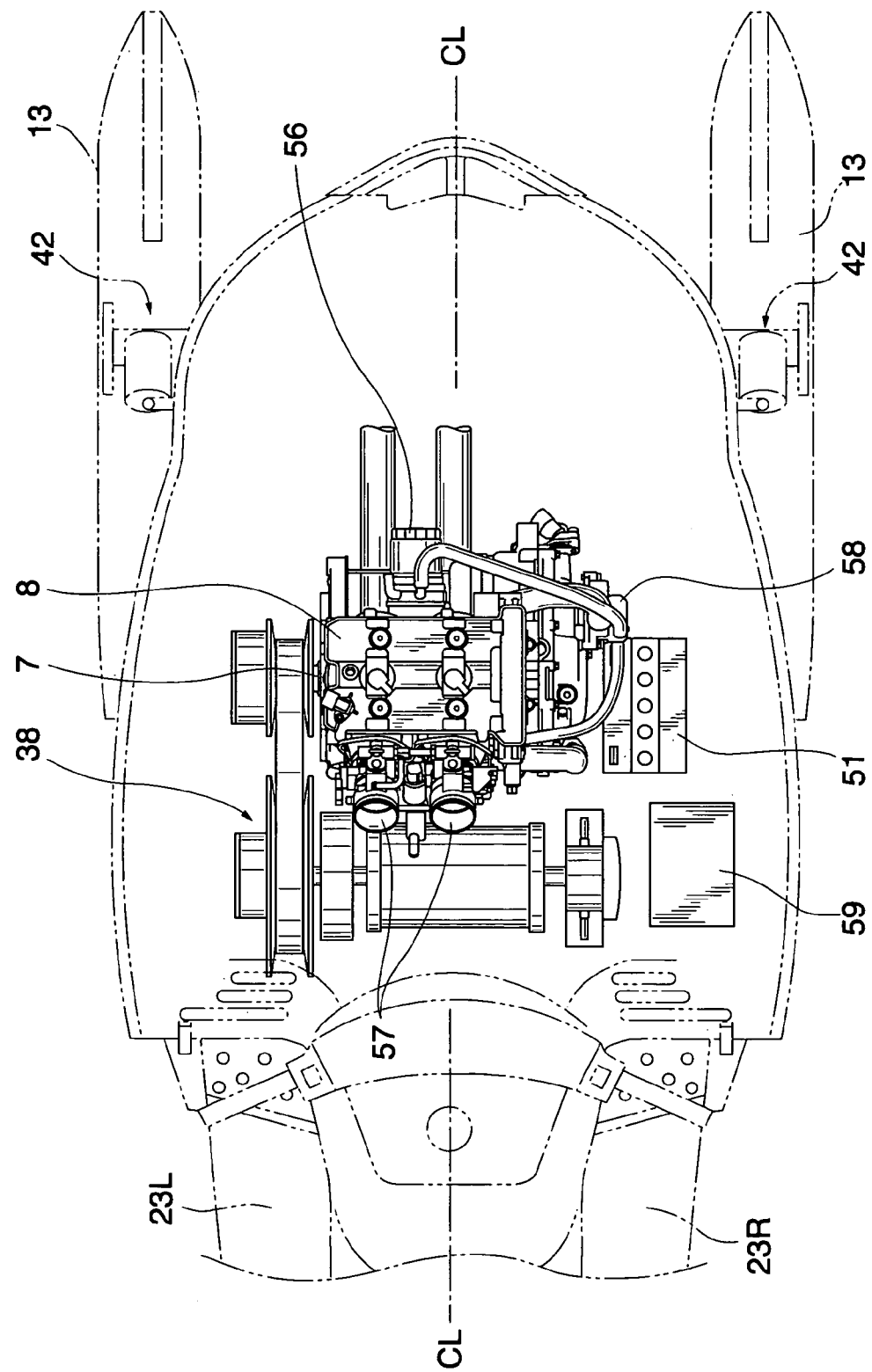
FIG. 3 is a perspective view showing the interior of the engine room as viewed from the top side of the vehicle.

FIG. 1 is a side view showing a snow vehicle with an engine starter mechanism arrangement according to an embodiment of the present invention. FIG. 2 is a perspective view showing the interior of an engine room as viewed from a lateral side of the vehicle. FIG. 3 is a perspective view showing the interior of the engine room as viewed from the top side of the vehicle.

The snow vehicle 1 has a two-cylinder four-cycle engine (hereinafter simply referred to as "the engine") 2 installed in the engine room 30, referred to hereinafter. In the following description, the terms "front", "rear", "left", "right", "forward", "rearward", and "transverse" related to the snow vehicle 1 will be used as referring to respective directions defined with reference to the position of a driver on a driver's seat.

First, a description will be given of the whole construction of the snow vehicle 1.

Referring first to FIG. 1, the snow vehicle 1 includes a body frame 10 extending in forward and rearward directions or running direction of the vehicle 1, a pair of left and right steering sleds 13 horizontally movably disposed under a front part (hereinafter referred to as "the front frame section") 10a of the body frame 10, and a driving crawler 16 for circulating a track belt 15 disposed under a rear part (hereinafter referred to as "the rear frame section") 10b of the body frame 10. The crawler 16 includes a pair of left and right drive wheels 17 disposed in the vicinity of a front end of the rear frame section 10b, a pair of left and right driven wheels 18 disposed in the vicinity of a rear end of the rear frame section 10b, a pair of left and right intermediate wheels 19, a suspension mechanism 20 that suspends and cushions these pairs of wheels, and the track belt 15 stretched over the wheels for turning around them.

The body frame 10 has a monocock structure. The front frame section 10a in which the engine 2 is installed is shaped generally like a boat bottom which progressively narrows toward the front in plan view, with an open top, and the front frame section 10a is covered with an engine hood 29 from above.

The front frame section 10a has a front part thereof formed as a sled housing section 41 protruding upward. The sled housing section 41 accommodates a suspension and steering mechanism 42. Further, a track housing 11, not shown, that accommodates a front part (above the drive wheel 17) of the crawler 16 is formed continuously and integrally with the rear frame section 10b.

The rear frame section 10b also plays the role of a cover accommodating the whole crawler 16 as viewed from above. A cradle-shaped seat 22 is disposed above the rear frame section 10b, and on opposite lateral sides of the seat 22 in a transverse direction of the vehicle body (body frame 10), there are provided running boards 23 (left and right running boards 23L and 23R) which are one step lower than the seat 22 (refer to FIG. 3). At an approximately central location in the transverse direction of the vehicle body between the seat 22 and the front frame section 10a, a steering post 25 is erected in a fashion extending rearwardly aslant, and a steering bar or handle bar 26 horizontally extends from the upper end of the steering post 25 in the transverse direction. The steering sleds 13 are operated via the steering post 25 by the steering bar 26.

In the vicinity of the steering bar 26 and in front thereof, an instrument panel 27 is provided. Further, a wind shield 28 extends aslant in front of the instrument panel 27 with its upper edge rearwardly located so as to cover the front side of the instrument panel 27 over the entire transverse size thereof. The engine hood 29 gently slopes down in generally streamlined fashion and is shaped generally like a boat bottom upside down. In the vicinity of a stepped border between the engine hood 29 and the instrument panel 27, a headlight 31 is disposed for illuminating ahead of the vehicle. The engine room 30 is defined under the instrument panel 27 and the engine hood 29 thus arranged.

Next, a description will be given of the construction of the engine 2 installed in the engine room 30.

Referring to FIG. 2, the engine 2 is a two-cylinder four-cycle engine with cylinder heads 4 thereof located on a top side thereof, and is disposed close to the steering post 25. The engine 2 has a crankshaft 7 extending substantially parallel to the transverse direction of the vehicle body (refer to FIG. 3), and is disposed with the cylinder heads 4 tilted rearward. With this disposition, the overall height of the engine is made so low that the engine hood 29 does not block an illumination light path from the headlight 31.

As shown in FIG. 3, a clutch mechanism 38 is disposed at a location leftward of the crankshaft 7 and in a left side part of the engine room 30. The clutch mechanism 38 is implemented e.g. by a V-belt continuously variable transmission with a centrifugal clutch incorporated therein, and is configured to transmit a driving force to the track belt 15 via its gears on the driven side.

As shown in FIG. 2, at a location in the upper part of the engine 2 and slightly rearward of the head cover 8, there is disposed a throttle body 57. An exhaust passage 36 extends in a front part of the engine 2, and an exhaust muffler, not shown, is connected to the exhaust passage 36. Thus, the snow vehicle 1 has the front side of the engine 2 as an exhaust side and the rear side of the engine 2 as an intake side.

As shown in FIGS. 2 and 3, a battery 51 is disposed on the right side of the engine 2. Further, in a rear part of the engine room 30, there is disposed a fuel tank 55 at a location rearward of the steering post 25. An oil tank 59 is disposed in a rear right-hand part of the engine room 30.

The snow vehicle 1 employs a dry sump lubrication system, and, as described in detail hereinafter, the engine 2 is provided with a feed oil pump (hereinafter referred to as "the oil pump") FEP for feeding lubricating oil, and a scavenging oil pump (hereinafter referred to as "the oil pump") SCP for recovering lubricating oil. As shown in FIG. 2, there are provided an oil pipe 53 for returning lubricating oil from the oil pump SCP to the oil tank 59, and an oil pipe 54 for feeding lubricating oil to the oil pump FEP.

Figure 4:
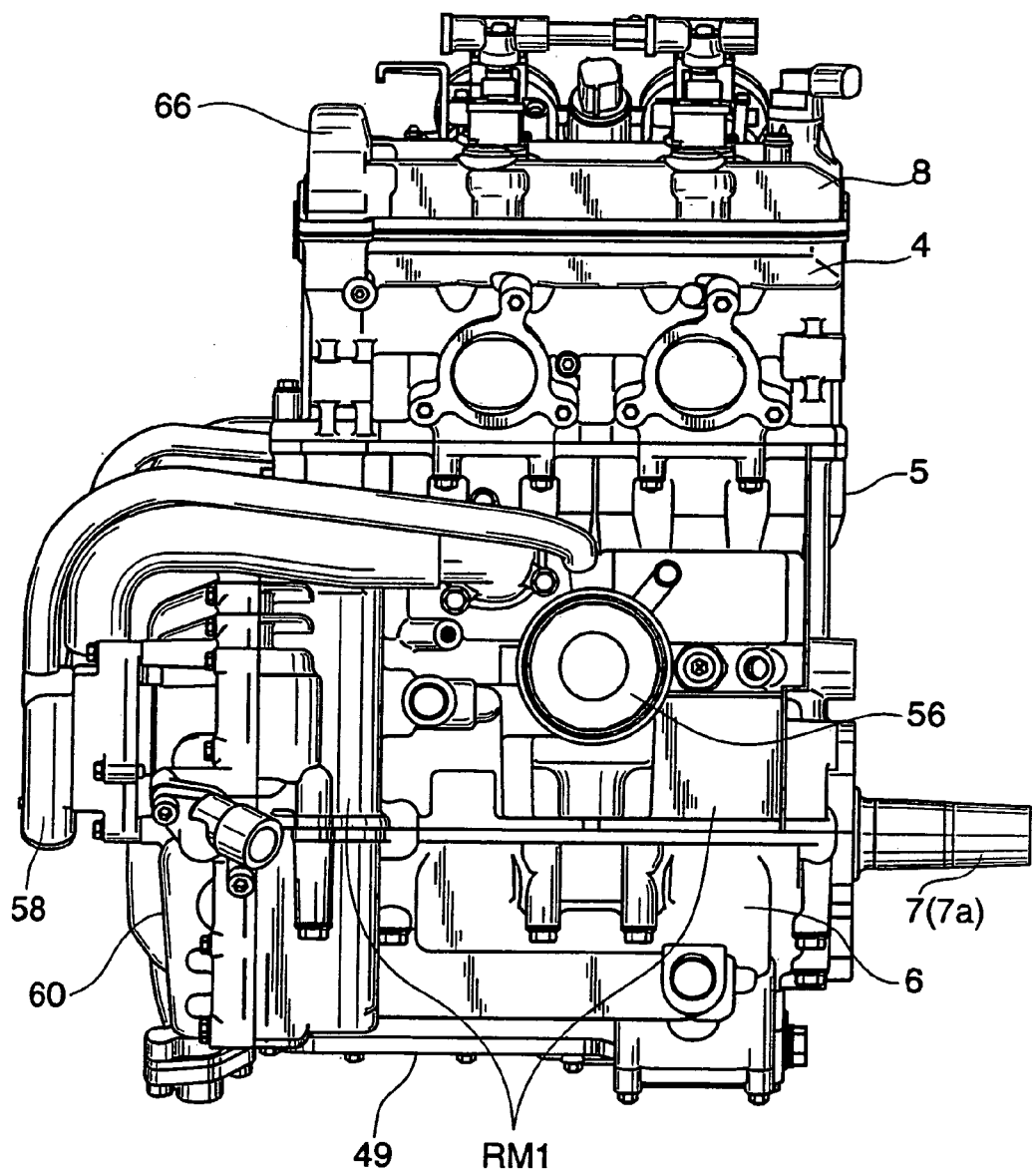
FIG. 4 is a front view showing an engine.
Figure 5:
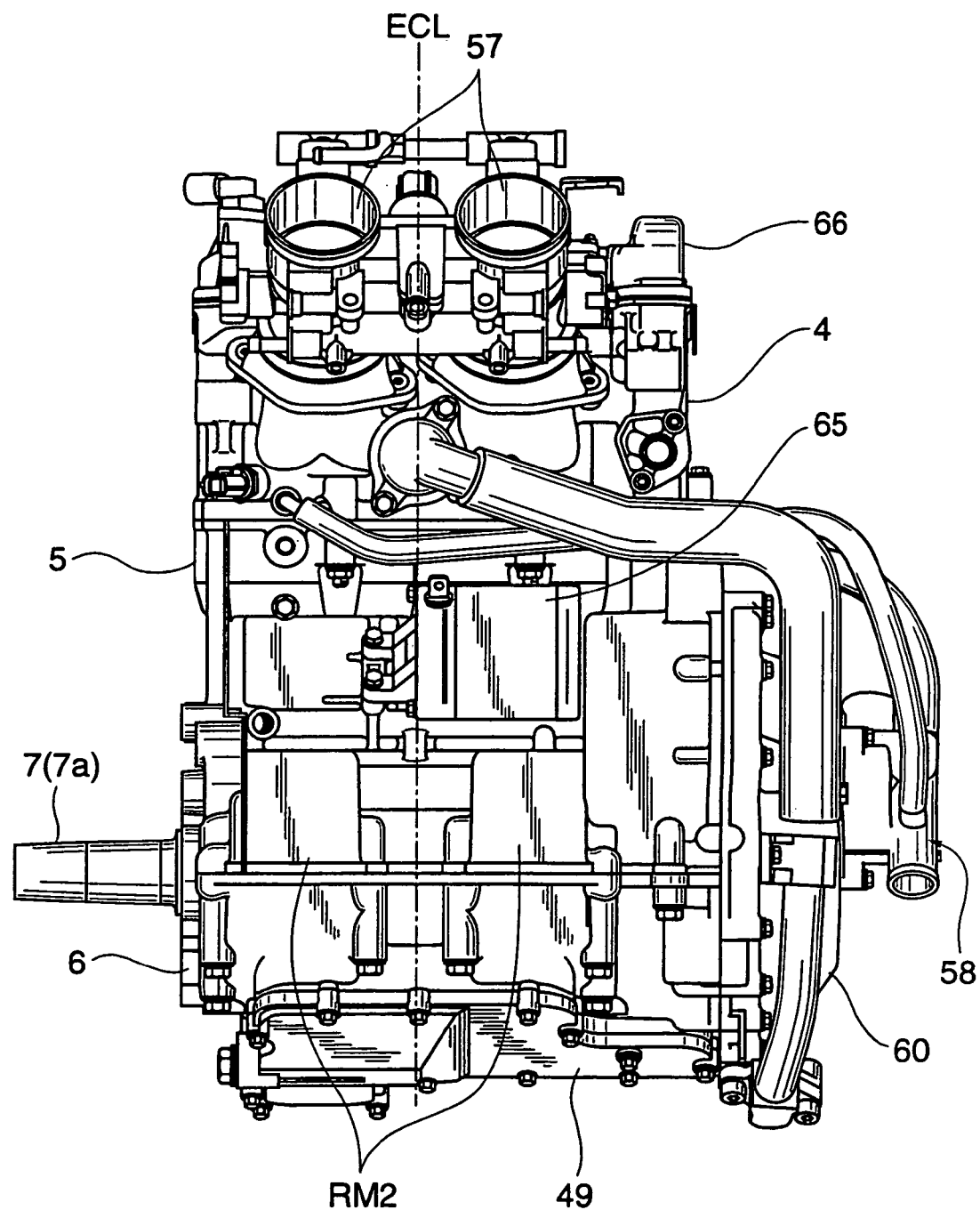
FIG. 5 is a rear view showing the engine.
Figure 6:
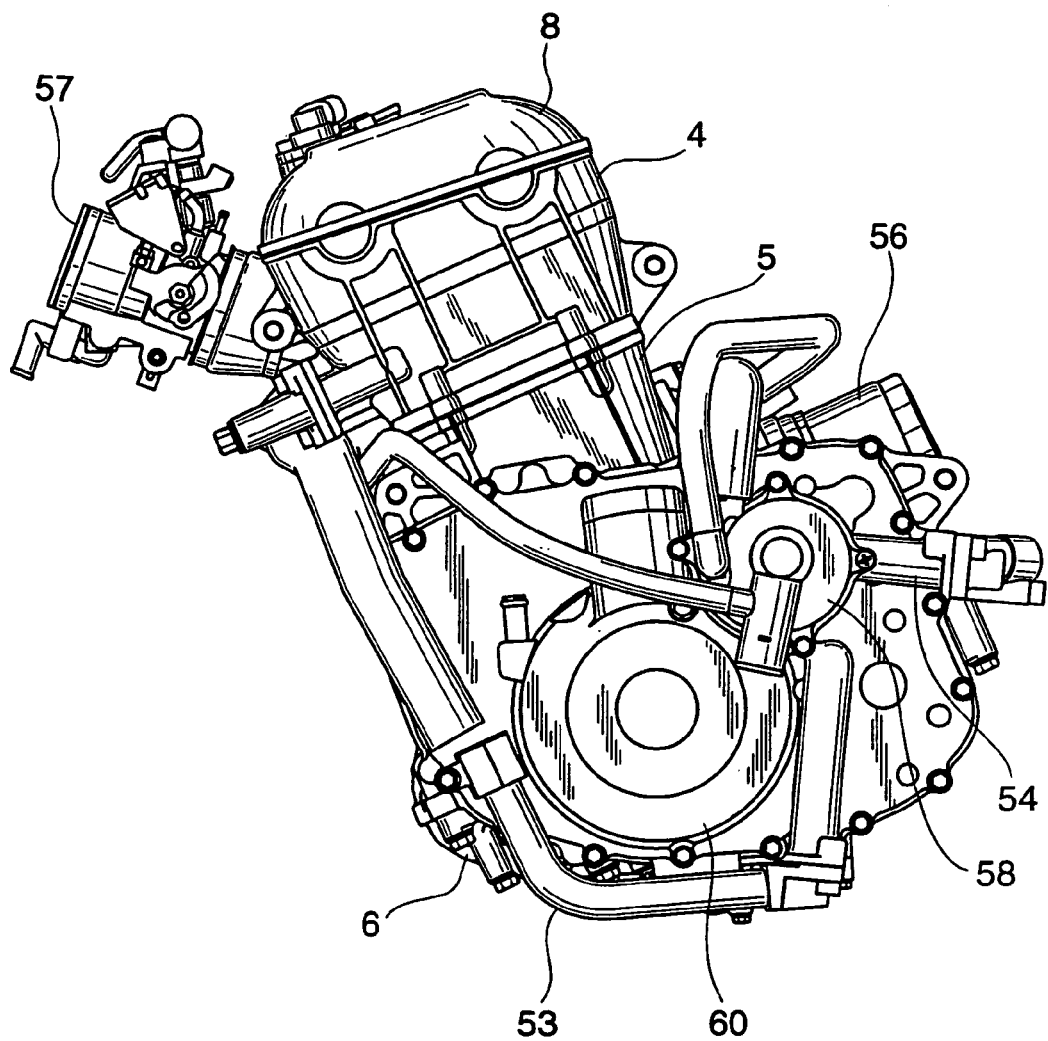
FIG. 6 is a right-side view showing the engine.

FIG. 4 is a front view showing the engine 2. FIG. 5 is a rear view showing the same. FIG. 6 is a right-side view showing the engine 2, and FIG. 7 a left-side view showing the same.

As shown in FIGS. 4 and 5, the crankshaft 7 is rotatably supported between an upper crankcase 5, which serves as a cylinder block, and a lower crankcase 6, and disposed such that an output shaft (PTO) 7a of the crankshaft 7 extends leftward. The upper crankcase 5 is disposed under the cylinder heads 4, and an oil pan 49 is disposed under the lower crankcase 6. Further, on the right side of the engine 2, there are provided a water pump 58 and a magnet cover 60. The magnet cover 60 is fixed to right-side parts of the upper crankcase 5 and the lower crankcase 6. The head cover 8 has a right part (left part as viewed in FIG. 4) thereof forming a cam chain chamber 66.

Figure 7:
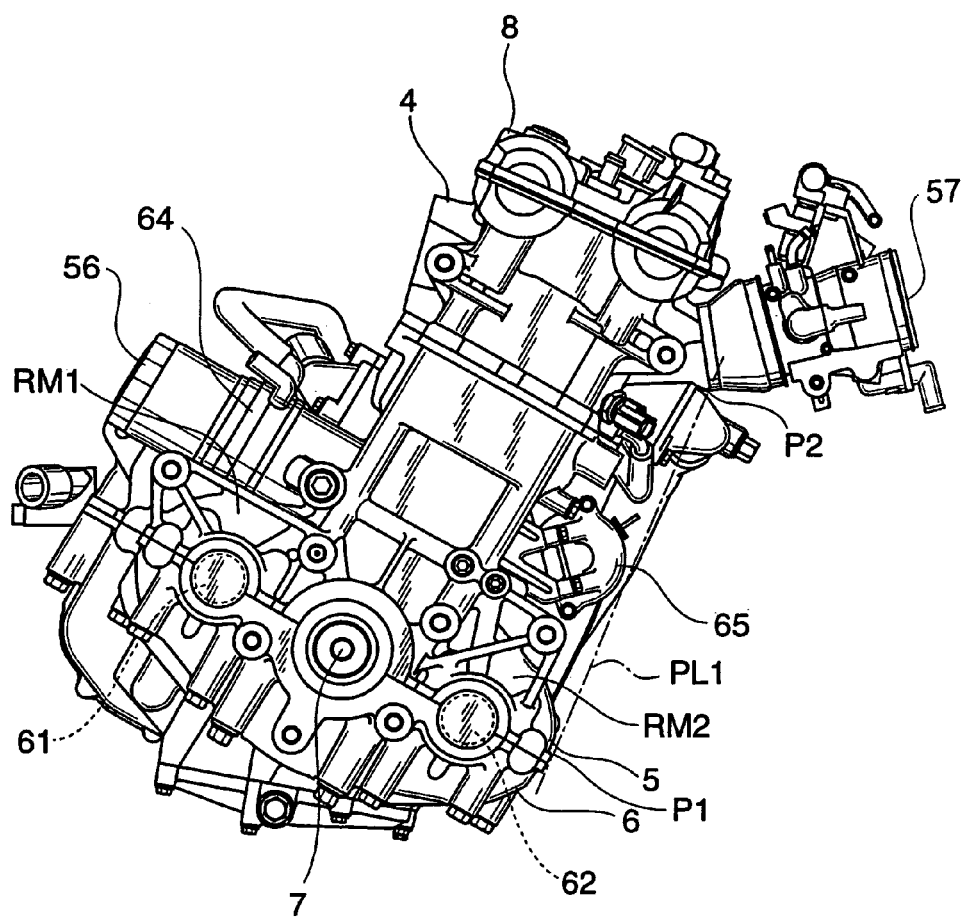
FIG. 7 is a left-side view showing the engine.

As shown in FIG. 7, a front balancer shaft 61 and a rear balancer shaft 62 are disposed at respective locations forward and rearward of the crankshaft 7, and extend substantially parallel to the crankshaft 7. The front and rear balancer shafts 61 and 62 are rotatably supported between the upper crankcase 5 and the lower crankcase 6, together with the crankshaft 7. Further, as shown in FIGS. 5 and 7, a starter motor 65 is provided above the rear balancer shaft 62 in a rear part of the engine 2.

As shown in FIGS. 4, 6, and 7, an oil filter 56 and a water-cooled oil cooler 64 are provided in a front part of the engine 2. The oil filter 56 is disposed substantially above the front balancer shaft 61 and mounted to the upper crankcase 5 via the oil cooler 64.

Figure 8:
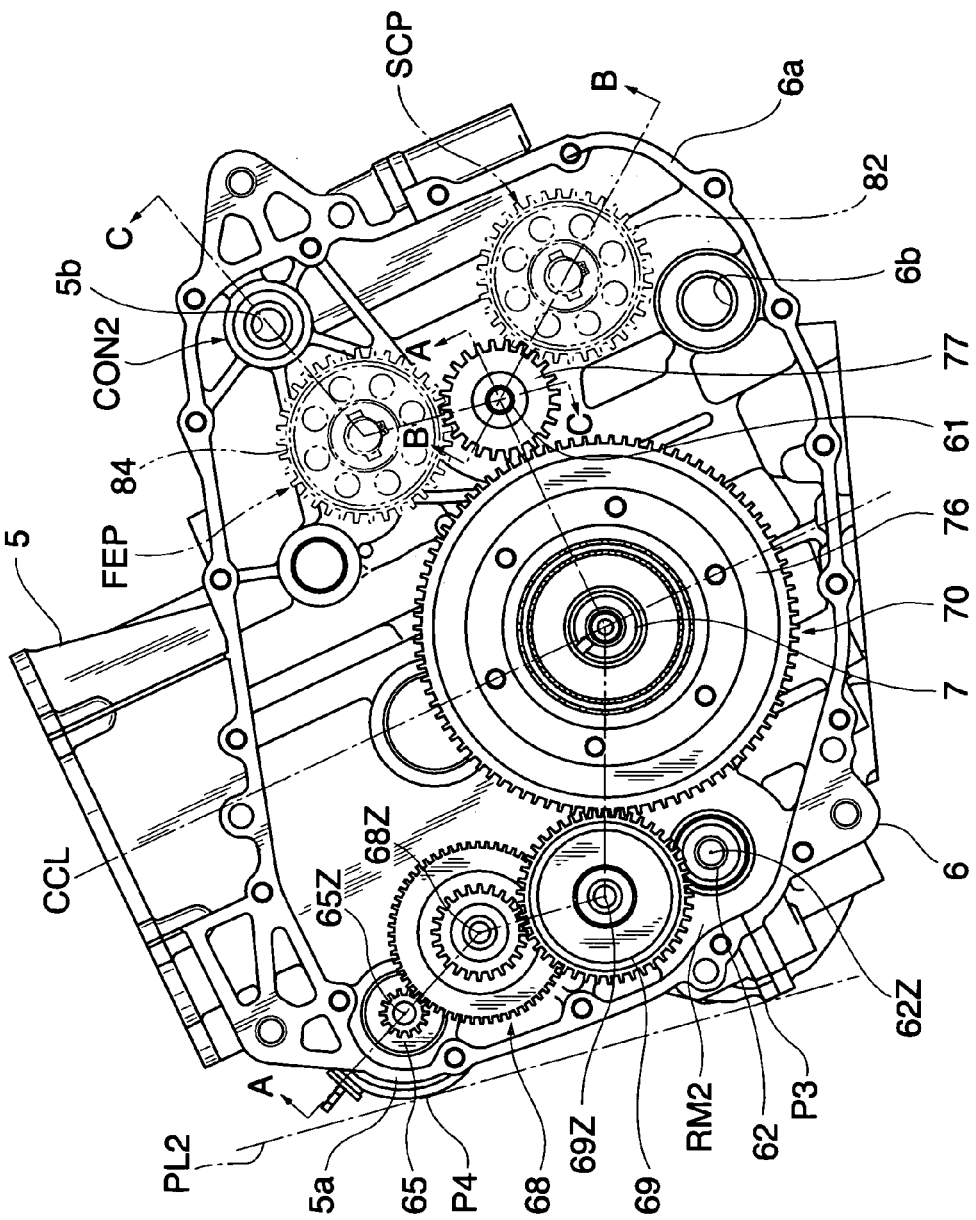
FIG. 8 is a right-side view showing an upper crankcase and a lower crankcase with a magnet cover and oil pumps removed therefrom.
Figure 9:
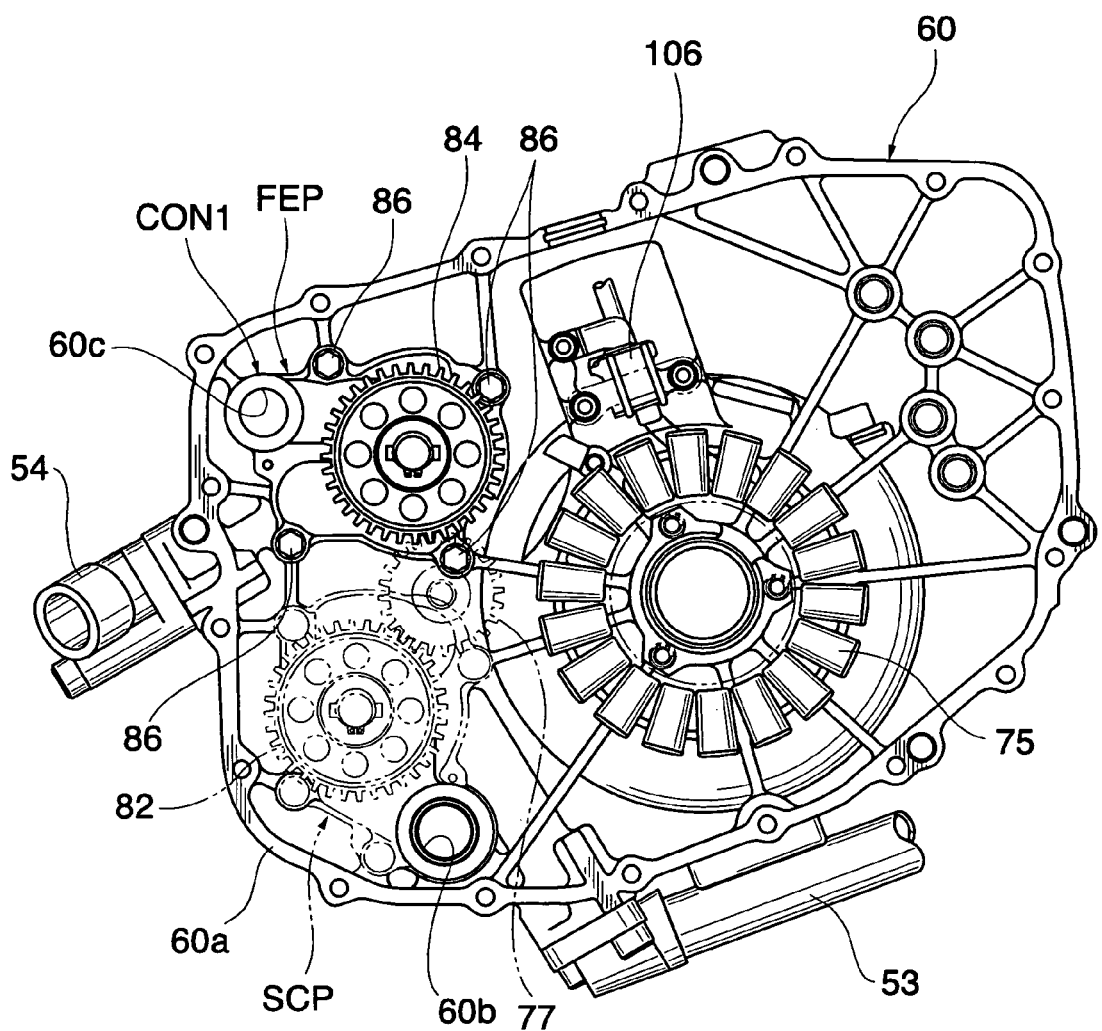
FIG. 9 is a left-side view showing the magnet cover.
Figure 10:
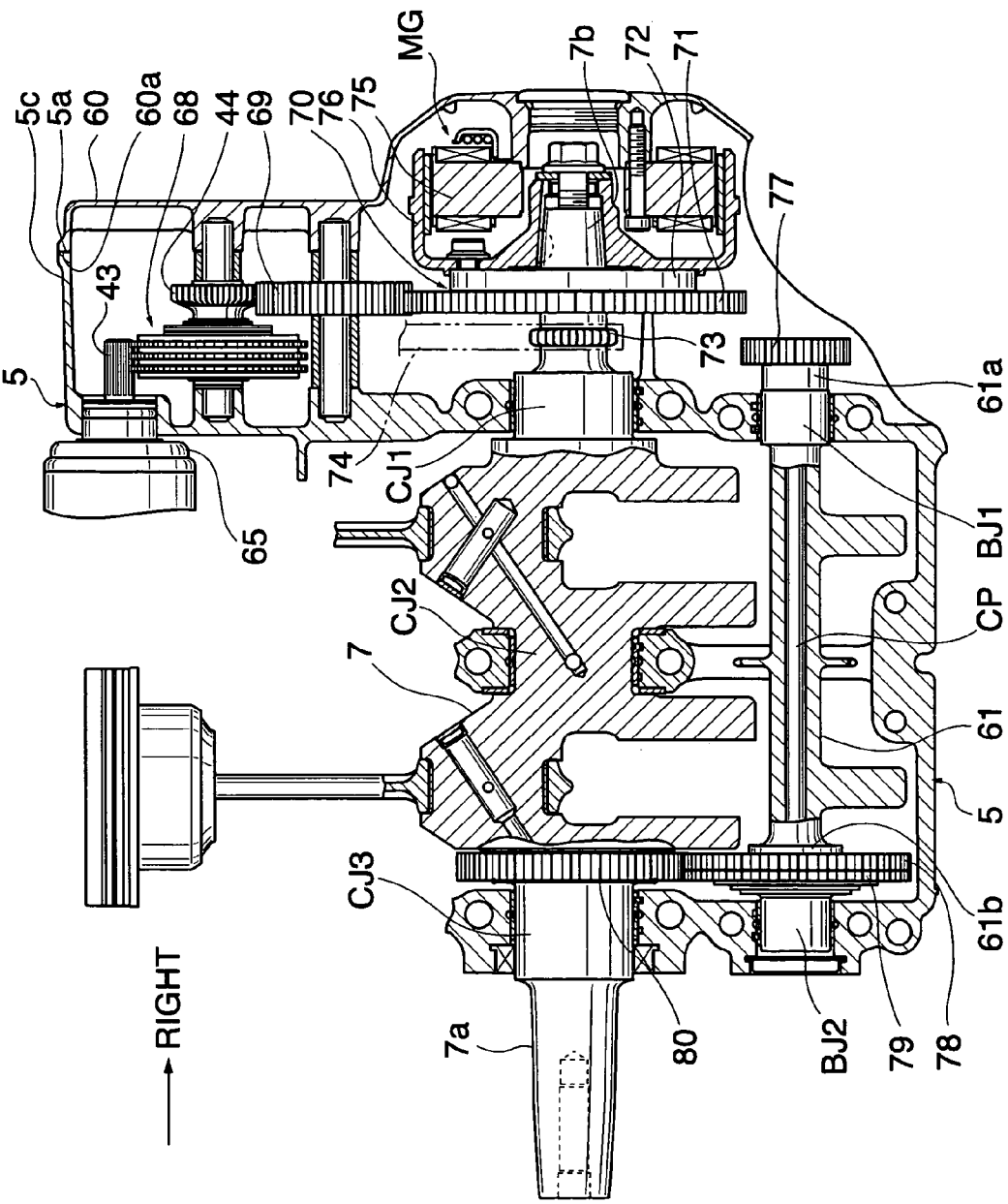
FIG. 10 is a cross-sectional view taken on line A—A of FIG. 8.
Figure 11:
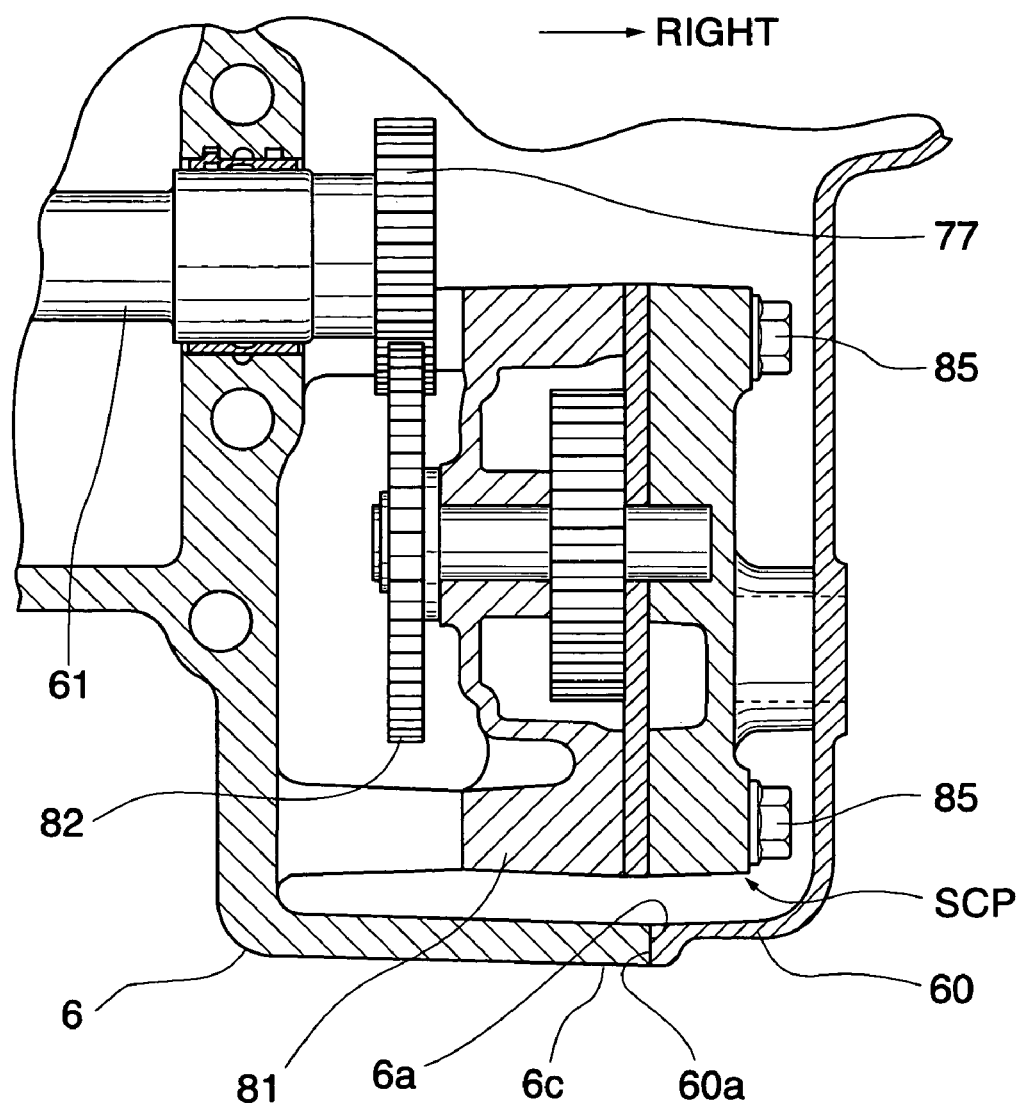
FIG. 11 is a cross-sectional view taken on line B—B of FIG. 8.

FIG. 8 is a right-side view showing the upper crankcase 5 and the lower crankcase 6, with the magnet cover 60 and the oil pump SCP removed therefrom. FIG. 9 is a left-side view showing the magnet cover 60. FIG. 10 is a cross-sectional view taken on line A—A of FIG. 8. FIG. 11 is a cross-sectional view taken on line B—B of FIG. 8.

As shown in FIGS. 10 and 11, the magnet cover 60 is mounted on the right-side parts 5c and 6c of the crankcases 5 and 6. When the magnet cover 60 is fixed onto the crankcases 5 and 6, a joint surface 5a (refer to FIGS. 8 and 10) of the upper crankcase 5 and a joint surface 6a (refer to FIGS. 8 and 11) of the lower crankcase 6 come into contact with a joint surface 60a (refer to FIGS. 9, 10, and 11) of the magnet cover 60 in facing relation.

Referring to FIG. 10, the crankshaft 7 is rotatably supported at its first to third journals CJ1 to CJ3. The front balancer shaft 61 is rotatably supported at its first and second journals BJ1 and BJ2, and although not shown, the rear balancer shaft 62 is supported similarly to the front balancer shaft 61.

The front balancer shaft 61 has first and second balancer shaft driven gears 78 and 79 rigidly fitted on a left end 61b thereof, and an oil pump drive gear 77 rigidly fitted on a right end 61a thereof. The crankshaft 7 has a balancer shaft drive gear 80 fitted thereon at a location rightward of the third journal CJ3 so that rotation of the crankshaft 7 is transmitted to the front balancer shaft 61 via the balancer shaft drive gear 80 and the first and second balancer shaft driven gears 78 and 79.

Figure 13:
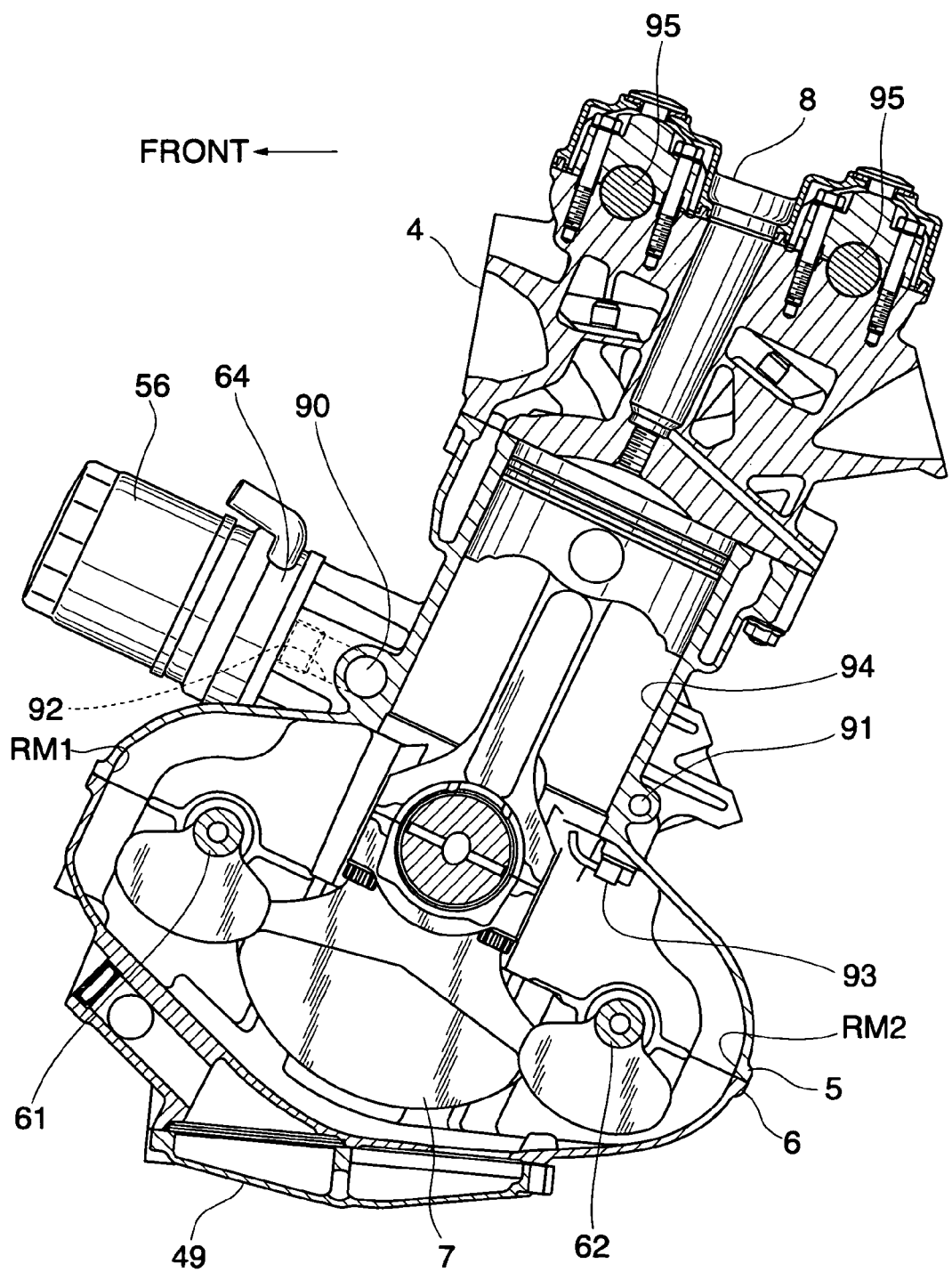
FIG. 13 is a longitudinal cross-sectional view showing the engine.

The crankshaft 7 has a cam sprocket 73 rigidly mounted on a right end 7b thereof opposite from the output shaft 7a, and a cam chain 74 is passed over the cam sprocket 73 to transmit the driving force to camshafts 95, as shown in FIG. 13. Also mounted on the right end 7b of the crankshaft 7 substantially in concentricity with the crankshaft 7 is a starter clutch section 70 which is comprised of a starter one-way gear 71 and a starter one-way clutch 72.

At a location rightward of the starter clutch section 70, there is provided a magnet (magnet device) MG for power generation. The magnet MG is disposed between the two crankcases 5 and 6 and the magnet cover 60. The magnet MG is comprised of a magnet flywheel 76, a magnet stator 75, and a pulser coil 106 (refer to FIG. 9). The magnet flywheel 76 is mounted on the right end 7b of the crankshaft 7, for rotation in unison with the crankshaft 7. The magnet stator 75 and the pulser coil 106 are fixed to the magnet cover 60.

The starter one-way clutch 72 is disposed between the cam sprocket 73 and the magnet MG, and fixed to the magnet flywheel 76. The starter one-way clutch 72 has a ratchet structure that transmits rotation of the starter one-way gear 71 to the crankshaft 7, but inhibits transmission of rotation of the crankshaft 7 to the starter one-way gear 71.

Further, as shown in FIG. 8, above the rear balancer shaft 62, there are disposed a starter gear 69, a starter limiter 68, and a starter motor 65 in the mentioned order from below and in a substantially linear arrangement, as viewed from a lateral side of the engine (or as viewed in an axial direction of the crankshaft 7). More specifically, respective axial centers 62z, 69z, 68z, and 65z of the rear balancer shaft 62, the starter gear 69, the starter limiter 68, and the starter motor 65 are arranged substantially linearly and substantially along a central axis CCL (refer to FIG. 8) of two cylinders 94 (refer to FIG. 13), referred to hereinafter. With this layout of these components, it is possible to make effective use of space on a side of the cylinders 94 toward the rear balancer shaft 62. The starter motor 65, the starter limiter 68, the starter gear 69, and the starter clutch section 70 form a "starter mechanism".

On the other hand, as shown in FIGS. 8 and 9, the oil pump FEP and the oil pump SCP are disposed above and below the front balancer shaft 61, respectively, and mounted between the two crankcases 5 and 6 and the magnet cover 60. Therefore, within the magnet cover 60, the starter gear 69 and the starter limiter 68 (hereinafter also referred to as "the transmission mechanism") having the function of transmitting rotation of the starter motor 65 to the starter clutch section 70 are located on an opposite side of the crankshaft 7 from the two pumps FEP and SCP, as viewed in the axial direction of the crankshaft 7. This arrangement makes it possible to accommodate the transmission mechanism in a space saving manner.

As shown in FIG. 5, the starter motor 65 is disposed on an opposite side of a transverse center ECL of the engine 2 from the clutch mechanism 38, i.e. at a location rightward of the transverse center ECL. This arrangement makes it possible to achieve appropriate weight distribution between the starter motor 65 and the weighty clutch mechanism 38.

Now, let it be assumed that a first imaginary plane PL1 parallel to the transverse direction of the vehicle body is moved toward the cylinder heads 4, the upper crankcase 5, and the lower crankcase 6, for contact therewith from the rear side. In this case, as shown in FIG. 7, the imaginary plane PL1 comes into contact with a contact point P2 on the cylinder heads 4 and a contact point P1 on a balancer chamber RM2 of the upper crankcase 5. Further, when it is assumed that a second imaginary plane PL2 parallel to the transverse direction of the vehicle body is moved toward the starter motor 65, the upper crankcase 5, and the lower crankcase 6, for contact therewith from the rear side, as shown in FIG. 8, the imaginary plane PL2 comes into contact with a contact point P4 on the starter motor 65 and a contact point P3 on the balancer chamber RM2 of the upper crankcase 5.

As shown in FIG. 7, the starter motor 65 is disposed such that it does not project rearward from the first imaginary plane PL1. Further, as shown in FIG. 8, the "transmission mechanism" formed by the starter gear 69 and the starter limiter 68 is disposed such that it does not project rearward from the second imaginary plane PL2. Thus, the starter motor 65 and the transmission mechanism are disposed close to the center of the vehicle body in a compact layout, with the weight thereof concentrated toward the center of the vehicle.

The starter limiter 68 transmits the driving force within a predetermined range. As the starter motor 65 rotates to start the engine 2, the rotation of the starter motor 65 is transmitted from a pinion gear 43 of the starter motor 65 (refer to FIG. 10) to the starter one-way gear 71 via the starter limiter 68, a drive gear 44 formed integrally with the starter limiter 68, and the starter gear 69. Since the starter one-way gear 71 and the starter one-way clutch 72 are formed integrally with each other, the rotation of the starter one-way gear 71 is transmitted to the right end 7b of the crankshaft 7 via the starter one-way clutch 72 and the magnet flywheel 76, whereby the crankshaft 7 is driven for rotation to start the engine 2.

As shown in FIG. 11, the oil pump SCP is comprised of an SC pump body 81 and an SC pump driven gear 82, and is fixed to the lower crankcase 6 by a plurality of bolts 85. The SC pump driven gear 82 is in mesh with the oil pump drive gear 77, so that the oil pump SCP is driven by the front balancer shaft 61 via the oil pump drive gear 77.

As shown in FIG. 8, the lower crankcase 6 has an oil suction hole 6b formed therein at a location below the oil pump SCP, and an oil suction hole 60b associated with the oil suction hole 6b is formed through the magnet cover 60 (refer to FIG. 9). Lubricating oil stored in the oil pan 49 (refer to FIGS. 4 and 5) is returned by the oil pump SCP through the oil suction hole 6b and the oil suction hole 60b, to be collected in the oil tank 59 through the oil pipe 53. Subsequently, the lubricating oil is guided from the oil tank 59 to the oil pump FEP through the oil pipe 54 (refer to FIGS. 2 and 3).

Figure 12:
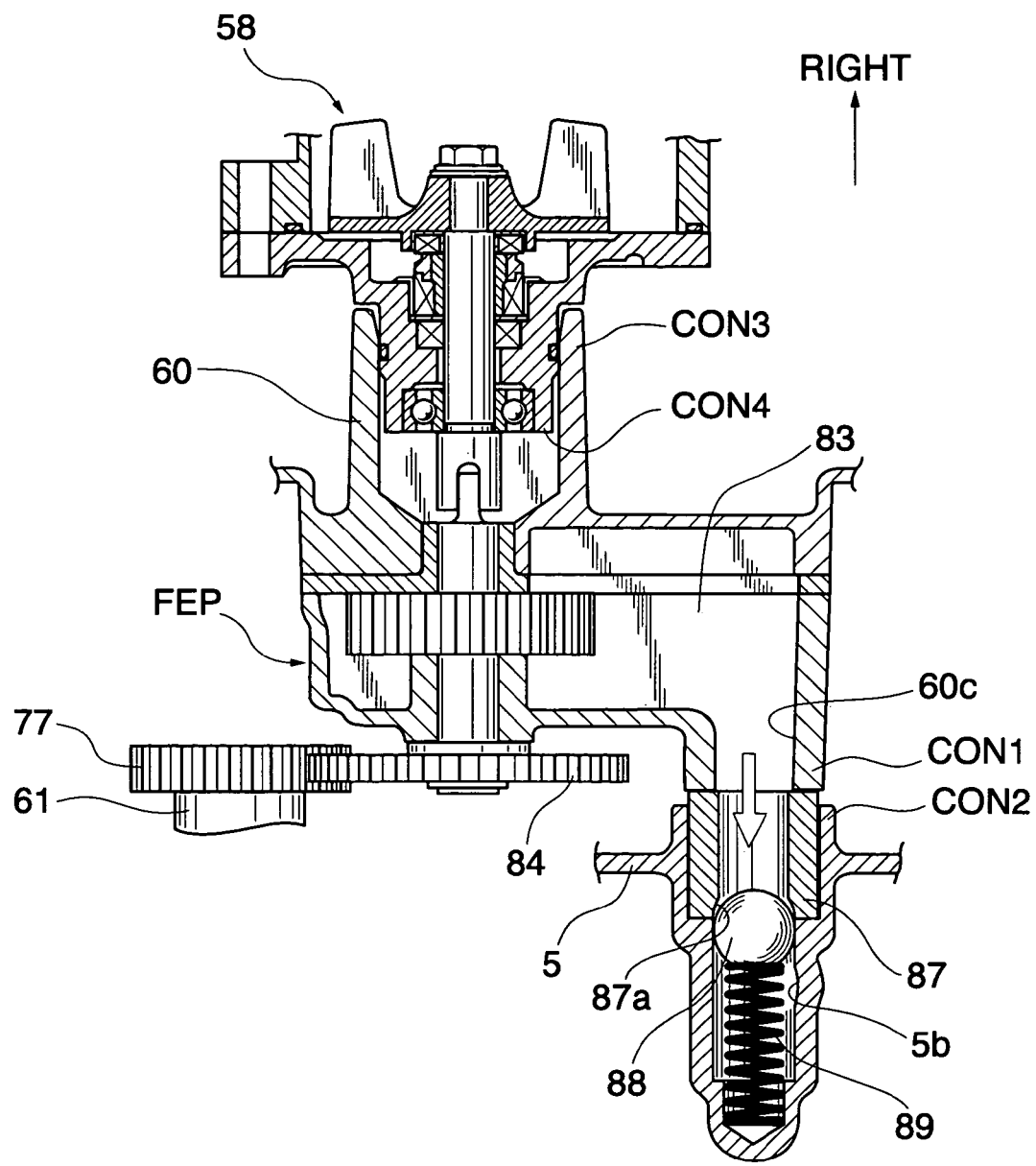
FIG. 12 is a cross-sectional view taken on line C—C of FIG. 8.

FIG. 12 is a cross-sectional view taken on line C—C of FIG. 8. The oil pump FEP is comprised of an FE pump body 83 and an FE pump driven gear 84, as shown in FIG. 12, and is fixed to the magnet cover 60 by a plurality of bolts 86 (refer to FIG. 9). The FE pump driven gear 84 is in mesh with the oil pump drive gear 77, so that the oil pump FEP is driven by the front balancer shaft 61 via the oil pump drive gear 77.

The SC pump driven gear 82 and the FE pump driven gear 84 are both generally identical in position in the axial direction of the front balancer shaft 61, to the oil pump drive gear 77. Insofar as the positional relationship between these components in the axial direction of the front balancer shaft 61 is concerned, the SC pump driven gear 82 is disposed closer to the axial center CP (refer to FIG. 10) of the front balancer shaft 61 than the SC pump body 81 is, and similarly, the FE pump driven gear 84 is disposed closer to the axial center CP than the FE pump body 83 is. Further, the oil pump drive gear 77 is offset to the axial center CP of the front balancer shaft 61 relative to the starter one-way gear 71. With the arrangement described above, it is possible to suppress rightward protrusion of the magnet flywheel 76, thereby contributing to reduction of the overall width of the engine 2. Further, the offset between the oil pump drive gear 77 and the starter one-way gear 71 makes it possible to increase the degree of freedom in the gear diameters of the gears 77 and 71.

As shown in FIG. 12, the water pump 58 is disposed in concentricity with the oil pump FEP at a location rightward of the same. A fitted part CON4 of the water pump 58 is fitted in a water pump mounting part CON3 of the magnet cover 60, whereby the water pump 58 is held in a state rigidly secured to the magnet cover 60, for being driven together with the oil pump FEP. A connecting part CON1 of the magnet cover 60 is opposed to a connecting part CON2 of the upper crankcase 5.

As shown in FIG. 8, the connecting part CON2 of the upper crankcase 5 is formed with a hole 5b for introducing lubricating oil into the engine 2. On the other hand, as shown in FIG. 9, the connecting part CON1 of the magnet cover 60 is formed with a hole 60c as a lubricating oil discharge port of the oil pump FEP. Referring again to FIG. 12, the connecting part CON2 is provided with a sealing resilient member 87 formed e.g. of rubber, a backflow-preventive ball 88, and a spring 89, which are arranged in the mentioned order from the magnet cover side. The sealing resilient member 87 has a ball-seating portion 87a against which the backflow-preventive ball 88 can abut. The spring 89 constantly urges the backflow-preventive ball 88 toward the sealing resilient member 87. The sealing resilient member 87 is sandwiched between the connecting part CON1 and the connecting part CON2, so that no special fixing member is needed, which simplifies the construction of the sealing resilient member 87.

When lubricating oil fed under pressure is delivered from the oil pump FEP into the connecting part CON2 via the hole 60c of the connecting part CON1, the backflow-preventive ball 88 moves away from the sealing resilient member 87 against the resilient force of the spring 89. Then, the lubricating oil flows into the hole 5b through a gap created between the backflow-preventive ball 88 and the sealing resilient member 87, to be supplied into the engine 2. On the other hand, when lubricating oil starts to flow from the hole 5b toward the hole 60c, the resilient force of the spring 89 urges the backflow-preventive ball 88 into contact with the ball-seating portion 87a of the sealing resilient member 87, to seal between the backflow-preventive ball 88 and the sealing resilient member 87. This makes it possible to prevent backflow of lubricating oil during stoppage of the engine and entry of lubricating oil from the oil tank 59 side.

FIG. 13 is a longitudinal cross-sectional view showing the engine 2. As shown in FIGS. 7 and 13, the front balancer shaft 61 and the rear balancer shaft 62 are accommodated, respectively, in a balancer chamber RM1 and the balancer chamber RM2, each defined by joining parts (connecting parts) of the upper and lower crankcases 5 and 6. The oil filter 56 is disposed above the balancer chamber RM1 in a manner facing obliquely upward. The engine 2 is tilted rearward such that a space is formed in the vicinity of the front part of the upper half of the engine 2. Therefore, by disposing the oil filter 56 in this space, it is possible to prevent forward projection of the oil filter 56 and interference of the same with other component parts, and also save space. Further, the oil filter 56 is disposed above the front balancer shaft 61 positioned at a location elevated by the inclination of the engine 2, which makes the oil filter 56 higher in position, and what is more, in a manner facing obliquely upward. This disposition of the oil filter 56 facilitates replacement operation e.g. for periodical replacement thereof.

As shown in FIG. 13, a main oil gallery 90 is formed in the upper crankcase 5 at a location forward of the cylinders 94. The main oil gallery 90 is in communication with an oil passage 92 into which oil flows from the oil filter 56. Further, a sub oil gallery 91 is formed in the upper crankcase 5 at a location rearward of the cylinders 94 and on an opposite side of the upper crankcase 5 from the main oil gallery 90. The main oil gallery 90 and the sub oil gallery 91 both extend in the transverse direction. The main oil gallery 90 and the sub oil gallery 91 communicate with each other via an oil passage, not shown.

The lubricating oil fed under pressure from the oil pump FEP and having passed through the connecting part CON2 (refer to FIGS. 8 and 12) flows into the oil filter 56 via a relief valve, not shown. Then, the lubricating oil flows from the oil filter 56 through the main oil gallery 90, whereafter part of the lubricating oil lubricates the first to third journals CJ1 to CJ3 of the crankshaft 7 and the first and second journals BJ1 and BJ2 of the balancer shafts 61 and 62, and the remaining part of the same flows through the sub oil gallery 91, and is injected from a piston cooling jet 93, to lubricate the interior of the cylinders 94 (including the associated pistons).

According to the present embodiment, the starter motor 65 is disposed above the rear balancer shaft 62 in the rear part of the engine 2, whereby the relatively weighty starter motor 65 is positioned close to the center of the vehicle body. Thus, the starter mechanism is disposed so as to maintain excellent traveling stability of the vehicle. Further, due to disposition of the starter motor 65 in the rear part of the engine 2, it is possible to suppress the influence of traveling wind upon the starter motor 65, thereby protecting the starter motor 65 e.g. from rain, snow and dust, and preventing troubles caused by rust, a short circuit, and so forth.

Particularly, while in the engine room 30, the clutch mechanism 38 is disposed leftward of a transverse center CL (refer to FIG. 3) of the vehicle body, the starter motor 65 is disposed rightward of the transverse center ECL of the engine 2, so that the weight distribution between the starter motor 65 and the clutch mechanism 38 is well balanced, which makes it possible to further improve traveling stability.

Moreover, according to the present embodiment, the starter motor 65 is disposed forward of the first imaginary plane PL1, and the starter gear 69 and the starter limiter 68 are disposed forward of the second imaginary plane PL2. This makes it possible not only to save space within the engine, thereby suppressing an increase in the size of the engine, but also to concentrate weight load toward the center of the vehicle, thereby enhancing traveling stability of the vehicle. In addition, it is possible to enhance the degree of freedom in the layout of the interior of the engine room 30 and facilitate installment of the engine 2.

Further, the transmission mechanism is disposed in the magnet cover 60, on the substantially opposite side of the crankshaft 7 from the two pumps FEP and SCP. This makes it possible to dispose the transmission mechanism in a space saving manner, thereby suppressing an increase in the size of the engine.

Furthermore, according to the present embodiment, while in the engine room 30, the clutch mechanism 38 is disposed leftward of the transverse center CL (refer to FIG. 3) of the vehicle body, the magnet MG, the starter motor 65, and the battery 51 are arranged rightward of the transverse center CL, in a concentrated manner, and the battery 51 is disposed close to the magnet MG. This makes it possible not only to distribute the weights of the component elements in a more well-balanced manner to thereby maintain excellent traveling stability of the vehicle, but also to achieve more simplified wiring in the engine room 30 to thereby simplify the construction of the engine and save space within the engine room 30.

Moreover, according to the present embodiment, the starter clutch section 70 is disposed between the cam sprocket 73 and the magnet MG, and the starter one-way clutch 72 is fixed to the magnet flywheel 76 so that the driving force of the starter motor 65 can be transmitted to the crankshaft 7 via the starter one-way gear 71, the starter one-way clutch 72, and the magnet MG. As a result, the space for accommodating the starter mechanism can be reduced, and the construction of the starter mechanism can be simplified. In addition, since the starter gear 69, the starter limiter 68, and the starter motor 65 are arranged substantially linearly, as viewed from the lateral side of the engine, above the rear balancer shaft 62, it is possible to make effective use of space on the rear balancer shaft 62 side of the cylinders 94, thereby saving space. Thus, the starter mechanism can be disposed so as to suppress an increase in the size of the engine. Insofar as the linear arrangement of the rear balancer shaft 62, the starter gear 69, the starter limiter 68, and the starter motor 65 is secured, the engine 2 may be tilted forward, and at the same time the positional relationship in the longitudinal direction of the front balancer shaft 61, the rear balancer shaft 62, the starter gear 69, the starter limiter 68, and the starter motor 65 may be reversed to that in the above-described embodiment.

The above component elements within the engine room 30 may be arranged in a fashion symmetrically reverse to the arrangement in the above-described embodiment, which also makes it possible to obtain the advantageous effects of the present invention.

What is claimed is:

1. An engine starter mechanism arrangement for a snow vehicle having a vehicle body, comprising:
   an engine having a rear part;
   a crankshaft extending through said engine in a transverse direction of the vehicle body;
   a balancer shaft disposed in said rear part of said engine at a location rearward of said crankshaft and extending substantially parallel to said crankshaft; and
   a starter motor disposed in said engine at a location above said balancer shaft,
   wherein said engine is tilted rearward, and said engine is disposed forward of a steering post of the vehicle and close to the steering post.

2. An engine starter mechanism arrangement as claimed in claim 1, further comprising an engine room that accommodates said engine, and a clutch mechanism disposed in said engine room on one side thereof with respect to a transverse center of the vehicle body, and wherein said starter motor is disposed on an opposite side of said engine from a side thereof on which said clutch mechanism is disposed, with respect to a transverse center of said engine.

3. An engine starter mechanism arrangement for a snow vehicle having a vehicle body, comprising:
   a crankshaft extending in a transverse direction of the vehicle body;
   at least one crankcase having a rear part and rotatably supporting said crankshaft;
   at least one cylinder head disposed above said crankcase; and
   a starter motor disposed in said rear part of said crankcase,
   wherein said cylinder head is tilted rearward, and said cylinder head and said crankcase are disposed forward of a steering post of the vehicle and close to the steering post, and
   wherein said starter motor is disposed at a location such that when a first imaginary plane parallel to the transverse direction of the vehicle body is brought into contact with said cylinder head and said crankcase from a rear side thereof, said starter motor does not project rearward from the first imaginary plane.

4. An engine starter mechanism arrangement as claimed in claim 3, wherein said crankshaft has one end, and the engine starter mechanism arrangement further comprises a starter clutch section disposed on a side of said crankshaft toward said one end thereof, and a transmission mechanism disposed between said starter motor and said starter clutch section, for transmitting rotation of said starter motor to said starter clutch section, and
   wherein said transmission mechanism is disposed at a location such that when a second imaginary plane parallel to the transverse direction of the vehicle body is brought into contact with said starter motor and said crankcase from the rear side thereof, said transmission mechanism does not project rearward from the second imaginary plane.

5. An engine starter mechanism arrangement as claimed in claim 3, wherein said crankshaft has one end, and the engine starter mechanism arrangement further comprises a starter clutch section disposed on a side of said crankshaft toward said one end thereof, a transmission mechanism disposed between said starter motor and said starter clutch section, for transmitting rotation of said starter motor to said starter clutch section, a magnet cover fixed to said crankcase on the side of said crankshaft toward said one end thereof, and at least one oil pump disposed within said magnet cover, and wherein said transmission mechanism is disposed in said magnet cover on a substantially opposite side thereof with respect to said crankshaft, from said oil pump, as viewed in an axial direction of said crankshaft.

6. An engine starter mechanism arrangement for a snow vehicle having a vehicle body, comprising:
an engine having a side part;
an engine room that accommodates said engine;
a crankshaft having opposite ends and extending through said engine in a transverse direction of the vehicle body;
at least one crankcase having a rear part and rotatably supporting said crankshaft;
at least one cylinder head disposed above said crankcase;
a clutch mechanism disposed in said engine room on one side thereof with respect to a transverse center of the vehicle body;
a magnet device disposed in said side part of said engine on an opposite side of said engine room from the one side thereof with respect to the transverse center of the vehicle body;
a battery disposed in said engine room at a location close to said magnet device, on the opposite side of said engine room from the one side thereof with respect to the transverse center of the vehicle body;
a starter motor disposed in said rear part of said crankcase and on an opposite side of said engine from a side thereof on which said clutch mechanism is disposed, with respect to a transverse center of said engine; and
a starter clutch section mounted at a location toward one of said opposite ends of said crankshaft on the opposite side of said engine room from the one side thereof with respect to the transverse center of the vehicle body, substantially in concentricity with said crankshaft, said starter clutch section comprising a starter one-way clutch, and a starter one-way gear that transmits a driving force from said starter motor to said starter one-way clutch, wherein said starter one-way clutch is secured to said magnet device, and the driving force from said starter motor is transmitted to said crankshaft via said starter one-way gear, said starter one-way clutch, and said magnet device, wherein said cylinder head is tilted rearward, and said cylinder head and said crankcase are disposed forward of a steering post of the vehicle and close to the steering post, and wherein said starter motor is disposed at a location such that when a first imaginary plane parallel to the transverse direction of the vehicle body is brought into contact with said cylinder head and said crankcase from a rear side thereof, said starter motor does not project rearward from the first imaginary plane.

7. An engine starter mechanism arrangement for a snow vehicle, comprising:
a crankshaft having one end and extending in a transverse direction of the vehicle body;
at least one crankcase having a rear part and rotatably supporting said crankshaft;
at least one cylinder head disposed above said crankcase;
a starter motor disposed in said rear part of said crankcase;
a magnet device disposed at a location toward said one end of said crankshaft;
a cam sprocket mounted on said one end of said crankshaft;
a cam chain passed over said cam sprocket; and
a starter clutch section mounted at a location toward said one end of said crankshaft, substantially in concentricity with said crankshaft, said starter clutch section comprising a starter one-way clutch, and a starter one-way gear that transmits a driving force from said starter motor to said starter one-way clutch, wherein said starter clutch section is disposed between said cam sprocket and said magnet device, said starter one-way clutch is secured to said magnet device, and the driving force from said starter motor is transmitted to said crankshaft via said starter one-way gear, said starter one-way clutch, and said magnet device, wherein said cylinder head is tilted rearward, and said cylinder head and said crankcase are disposed forward of a steering post of the vehicle and close to the steering post, and wherein said starter motor is disposed at a location such that when a first imaginary plane parallel to the transverse direction of the vehicle body is brought into contact with said cylinder head and said crankcase from a rear side thereof, said starter motor does not project rearward from the first imaginary plane.

8. An engine starter mechanism arrangement for a snow vehicle having a vehicle body, comprising:
an engine having a rear part;
at least one cylinder;
a crankshaft having one end and extending through said engine in a transverse direction of the vehicle body, at a location below said cylinder;
at least one balancer shaft disposed in said rear part of said engine at at least one of locations forward and rearward of said crankshaft, and extending substantially parallel to said crankshaft;
a starter motor disposed in said engine at a location above said balancer shaft;
a starter clutch section mounted at a location toward said one end of said crankshaft, substantially in concentricity therewith; and
a starter limiter and a starter gear that cooperate with each other to transmit a driving force from said starter motor to said starter clutch section, wherein said starter gear, said starter limiter, and said starter motor are arranged substantially linearly, as viewed in an axial direction of said crankshaft, in order of said starter gear, said starter limiter, and said starter motor, from below, substantially along a central axis of said cylinder at a location above one of said at least one balancer shaft, and wherein said engine is tilted rearward, and said engine is disposed forward of a steering post of the vehicle and close to the steering post.

* * * * *